(12) United States Patent
Mitsuki et al.

(10) Patent No.: US 7,133,210 B2
(45) Date of Patent: Nov. 7, 2006

(54) EYEPIECE LENS

(75) Inventors: Shinichi Mitsuki, Kanagawa (JP); Motohisa Mouri, Kanagawa (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 11/235,277

(22) Filed: Sep. 27, 2005

(65) Prior Publication Data

US 2006/0066950 A1   Mar. 30, 2006

(30) Foreign Application Priority Data

Sep. 30, 2004  (JP) ............................. 2004-287294

(51) Int. Cl.
  *G02B 25/04*  (2006.01)
  *G02B 9/60*   (2006.01)
  *G02B 9/62*   (2006.01)
(52) U.S. Cl. .................. 359/643; 359/761; 359/770
(58) Field of Classification Search ........ 359/643–645, 359/784, 754–756, 761, 763, 770, 771, 773, 359/781, 782, 713–716
  See application file for complete search history.

(56) References Cited

U.S. PATENT DOCUMENTS

| 5,255,121 | A  | * | 10/1993 | Suzuki ................... | 359/643 |
| 6,052,234 | A  | * | 4/2000  | Mukai et al. ............ | 359/643 |
| 6,263,168 | B1 |   | 7/2001  | Hasushita et al. ........ | 396/382 |
| 2005/0013011 | A1 | | 1/2005 | Oshita ................... | 359/645 |

FOREIGN PATENT DOCUMENTS

| JP | 09-329752    | 12/1997 |
| JP | 2000-171731  | 6/2000  |
| JP | 2001-100115  | 4/2001  |
| JP | 2001-311881  | 11/2001 |
| JP | 2001-324684  | 11/2001 |
| JP | 2003-215471  | 7/2003  |
| JP | 2004-258234  | 9/2004  |
| JP | 2005-55874   | 3/2005  |

* cited by examiner

*Primary Examiner*—Scott J. Sugarman
*Assistant Examiner*—M. Hasan
(74) *Attorney, Agent, or Firm*—Miles & Stockbridge PC

(57) ABSTRACT

An eyepiece lens includes first lens group G1 having a negative refracting power including a negative meniscus lens with a concave surface facing eyepoint E.P side, second lens group G2 having a positive refracting power including a lens with both convex surfaces on both ends, and third lens group G3 having a negative refracting power including a negative lens. The first–third lens groups are arranged in an order from eyepoint E.P side, and the eyepiece lens is capable of varying a diopter by moving the second lens group along an optical axis. The eyepiece lens is configured by aspherical surfaces to make the positive refracting power weak while at least one surface of the convex surfaces of the lens deviates from the optical axis. Further, conditions of a following formula are satisfied:

$1.6 < f1/f3 < 2.5$ $-0.55 < S3 \leq 0$ where a focal length of first lens group G1 indicated f1, a focal length of third lens group G3 indicates f3, and a shape factor of third lens group G3 indicates S3, (provided shape factor S3 is defined by a conditional formula $S3 = (re_3 + rs_3)/(re_3 - rs_3)$ where $re_3$ indicates a radius of curvature of third lens group G3 on the eyepoint side and $rs_3$ indicates a radius of curvature thereof on the object side, and the formula is computed with a paraxial radius of curvature when the surface is the aspherical surface.).

4 Claims, 12 Drawing Sheets

EYEPIECE LENS

INCORPORATION BY REFERENCE

This invention claims the benefit of Japanese Patent application No. 2004-287294 which is hereby incorporated by reference.

FIELD OF THE INVENTION

This invention relates to an eyepiece optical system for observing through an erect system.

BACKGROUND OF THE INVENTION

An eyepiece lens for observing an image formed by an objective lens through the erect system in an enlarged manner has been known, wherein it is used in a single lens reflex camera. The eyepiece lens consists of three elements in three groups including a negative lens group (a first lens group), a positive lens group (a second lens group) and a negative lens group (a third lens group) in the order from the eyepoint side. The refracting powers of the second and third lens groups are appropriately decided. Further, aberrations are well corrected by moving the second lens group along an optical axis, whereby an image magnification is higher, and a diopter is adjustable (e.g., see the following Patent Application references 1 to 3).

[Patent Application reference 1] Japan Patent Laid open 2000-171731

[Patent Application reference 2] Japan Patent Laid open 2001-100115

[Patent Application reference 3] Japan Patent Laid open 2001-324684

With recent progression toward electronization of the cameras, various image pick-up devices have been mounted on these cameras. For example, a size of CCD used as the image pick-up device is as small as a few to a few tenths of a conventional silver halide film. Thus, as for the eyepiece lens, there is a strong demand for a higher magnification.

At the same time, in order to enhance a user's ease of use and enable an observation of an overall field to be easily, it is demanded that the eyepiece lens has a sufficiently long distance from an eyepiece lens in use to a pupil of the user (hereinafter referred to as an eye relief).

Furthermore, it is demanded that the eyepiece lens is provided with a diopter correcting function.

SUMMARY OF THE INVENTION

This invention has been contrived taking such the problem into consideration, and aims at providing an eyepiece lens having higher observation magnification and a long eye relief, and being capable of adjusting the diopter while maintaining well-corrected aberrations by giving the first lens group a specific refracting power.

In order to achieve the object, this invention includes a first lens group having negative refracting power including a negative meniscus lens with a concave surface facing the eyepoint side, a second lens group having a positive refracting power including a lens with convex surfaces on both ends, and a third lens group having a negative refracting power including a negative lens. The first–third lens groups are arranged in the order from the eyepoint side, and the eyepiece lens being capable of adjusting the diopter by moving the second lens group along the optical axis. The eyepiece lens is configured by aspherical surfaces to make the positive refracting power weak while at least one surface of the convex surfaces of the lens deviates from the optical axis. Further, the conditions of the following formula are satisfied:

$1.6 < f1/f3 < 2.5$ $-0.55 < S3 \leq 0$ where the focal length of the first lens group indicates f1, the focal length of the third lens group indicates f3, and the shape factor of the third lens group indicates S3, (provided shape factor S3 is defined by the conditional formula $S3 = (re_3 + rs_3)/(re_3 - rs_3)$ where $re_3$ indicates the radius of curvature of the third lens group on the eyepoint side and $rs_3$ indicates the radius of curvature thereof on the object side, and the formula is computed with the paraxial radius of curvature when the surface is the aspherical surface.)

The eyepiece lens is configured so as to satisfy the following formula $S1 < -3.0$ where a shape factor of the first lens group indicates S1 (, provided shape factor S1 is defined by the conditional formula $S1 = (re_1 + rs_1)/(re_1 - rs_1)$ where $re_1$ indicates the radius of curvature of the first lens group on the eyepoint side and $rs_1$ indicates the radius of curvature thereof on the object side, and the formula is computed with the paraxial radius of curvature when the surface is the aspherical surface.)

As described before, this invention can provide the eyepiece lens such that it has the higher observation magnification, the long eye relief, and can adjust the diopter while maintaining the well-corrected aberrations by giving the first lens group the specific refracting power.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE PREFERED EMBODIMENTS

Figure 1:
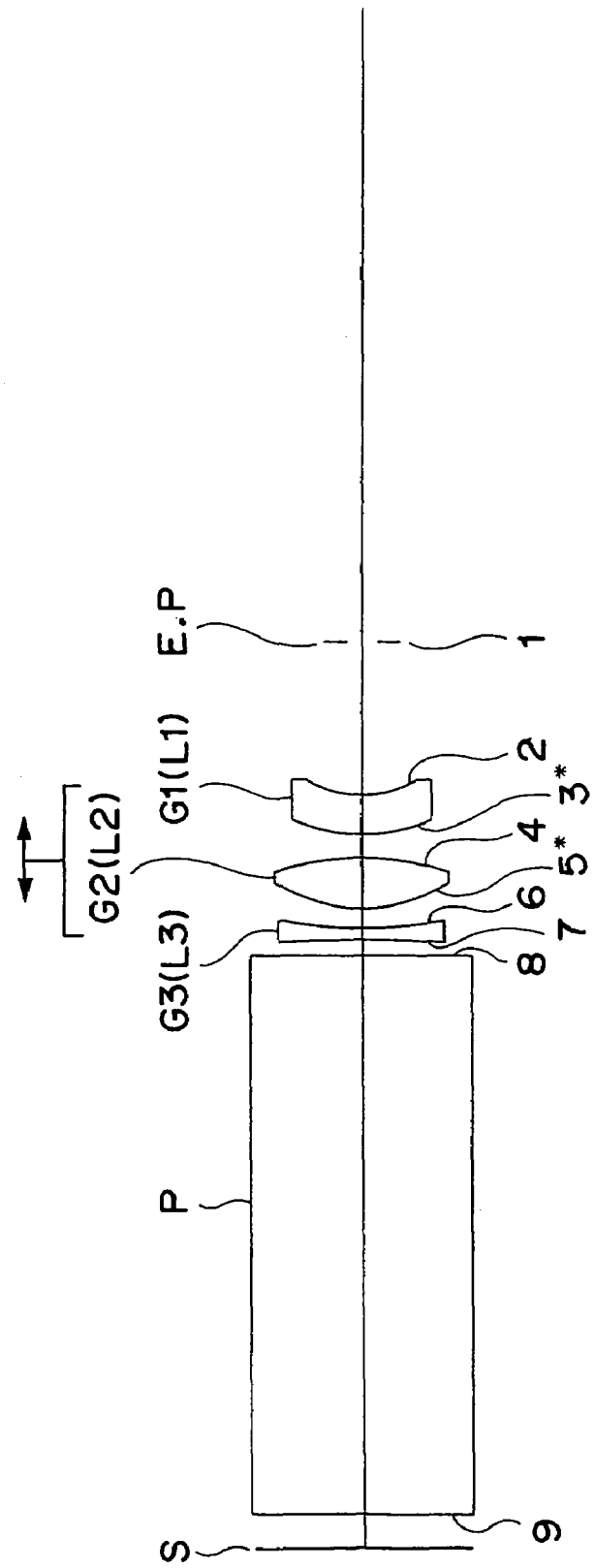
FIG. 1 is a configuration view for showing an eyepiece lens system (−1.00 dpt [m$^{-1}$]) according to the first embodiment of this invention.
Figure 2:
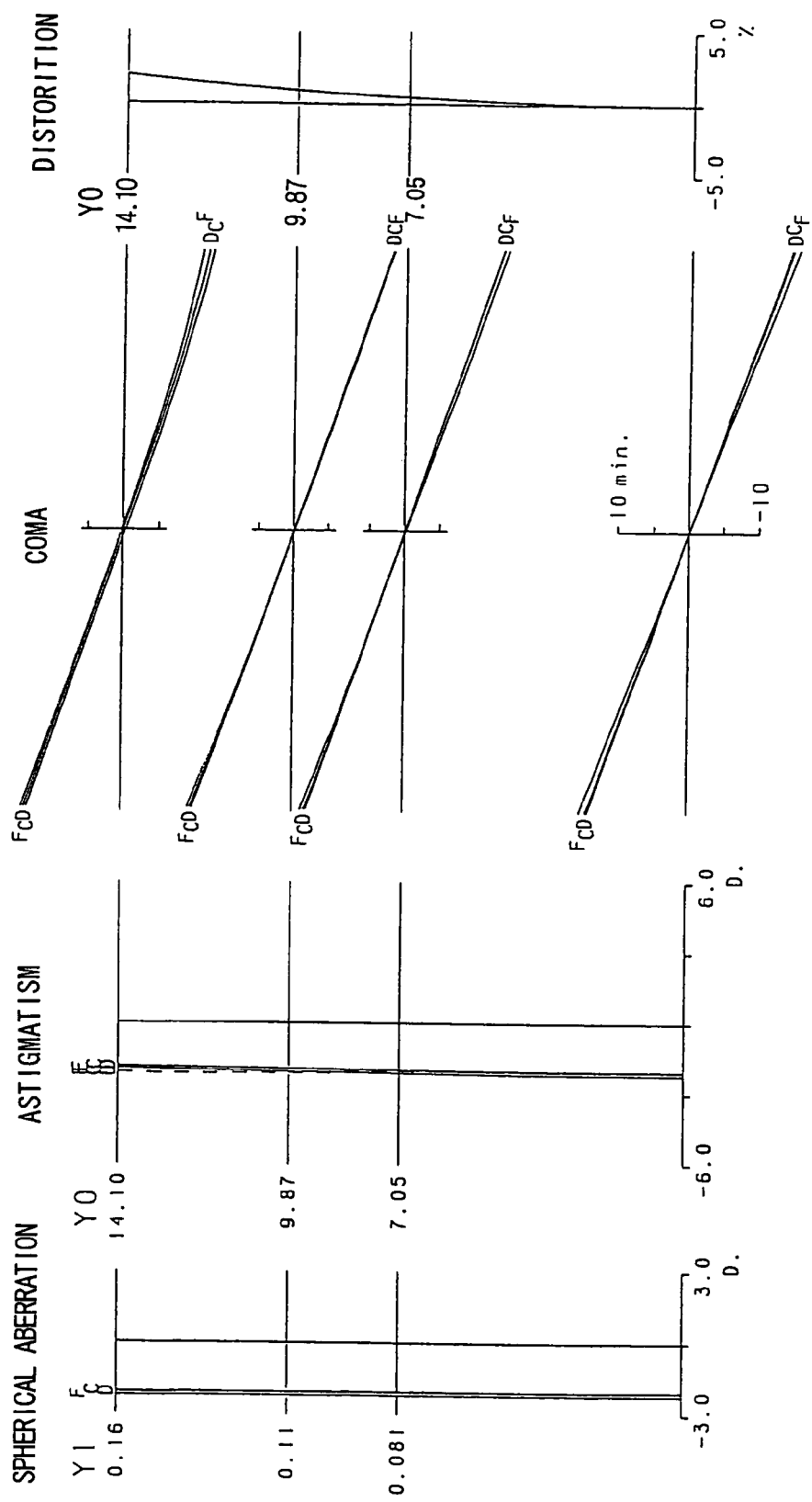
FIG. 2 is an aberration view when the diopter is −2.07 dpt [m$^{-1}$] in the first embodiment of this invention.

Preferable embodiments of this invention will be described below. In an eyepiece lens of this invention including a first lens group having a negative refracting power including a negative meniscus lens with a concave surface facing the eyepoint side, a second lens group having a positive refracting power including a lens with convex surfaces on both ends, and a third lens group having a negative refracting power including a negative lens. The first–third lens groups are arranged in the order from the eyepoint side, and the eyepiece lens being capable of adjusting the diopter by moving the second lens group along the optical axis. The lens consists of aspherical surfaces so as to make the positive refracting power weak as one surface of convex surfaces (in the second lens group) deviates from the optical axis.

According to this invention, in order to increase the magnification and permit the diopter to be adjusted as described above, the eyepiece lens is configured by the first lens group having the negative refracting power, the second lens group having the positive refracting power and the third lens group having the negative refracting power being arranged in the order from the eyepoint side. And, in order to enable the magnification to be great and the aberrations to be well corrected, the first lens group is configured to have the negative meniscus lens with the concave surface directed at the eyepoint side. Further, in order to correct fluctuations of a spherical aberration caused by the higher magnification and a spherical aberration due to the diopter adjustment, the eyepiece lens is configured to introduce the aspherical surfaces into the second lens group.

Further, according to this invention, out of the lens groups for constituting the eyepiece lens, especially by moving the second lens group having the positive refracting power, a small movement thereof enables the diopter to be corrected. And, according to this invention, by moving a plurality of the lens groups, the same effect can be also obtained.

According to this invention, it is preferable that the aspherical surfaces are introduced into the lens groups for constituting the eyepiece lens. For example, introduction of the aspherica surfaces into the first lens group or the second lens group enables a coma to be well corrected. Also, this permits the coma at each diopter when correcting the diopter to be well corrected.

Next, an eyepiece lens of this invention will be described in accordance with conditional formulas (1) to (3).

Let f1 be a focal length of the first lens group, f3 a focal length of the third lens group, and S3 a shape factor of the third lens group, (provided shape factor S3 is defined by a condition;

$$S3=(re_3+rs_3)/(re_3-rs_3)$$

where the radius of curvature of the surface of the third lens group facing the eyepoint side indicates re$_3$ and the radius of curvature of the surface thereof facing an object side indicates rs$_3$ and the condition is computed by the paraxial radius of curvature when the surface the aspherical surface.), then, it is preferable that following conditions (1) and (2) are satisfied.

$$1.6 < f1/f3 < 2.5 \quad (1)$$

$$-0.55 < S3 \leq 0 \quad (2)$$

In the eyepiece lens of this invention, the condition (1) defines a distribution of refracting powers of the negative lens groups (namely, the first and third lens groups). By satisfying the condition (1), the structure of the eyepiece lens of this invention enables the higher magnification and the diopter adjustment.

Below a lower limit of the condition (1), the refracting power of the first lens group becomes too large, and it is difficult to secure the long eye relief although the higher magnification can be easily achieved, which is not preferable. Above an upper limit of the condition (1), the refracting power of the first lens group becomes too small, and it is difficult to achieve the higher magnification.

In the structure of the eyepiece lens satisfying the condition (1), the condition (2) defines a shape of the third lens group. Satisfying the condition (2) enables the coma and the distortion to be well corrected. Below a lower limit of the condition (2), increases in a positive coma and a positive distortion make it difficult to correct these aberrations. Above an upper limit of the condition (2), an increase in the negative coma makes it difficult to correct the aberration.

Furthermore, according to this invention, let S1 be the shape factor of the first lens group, (provided shape factor S1 is defined by a condition;

$$S1=(re_1+rs_1)/(re_1-rs_1)$$

where the radius of curvature of the surface of the third lens group facing the eyepoint side indicates re$_1$ and the radius of curvature of the surface thereof facing an object side indicates rs$_1$ and the condition is computed by the paraxial radius of curvature when the surface the aspherical surface.), then, it is preferable that a following condition (3) is satisfied.

$$S1 < -3.0 \quad (3)$$

In the structure of the eyepiece lens satisfying the conditions (1) and (2), the condition (3) defines the shape of the first lens group. Satisfying the condition (3) enables a fluctuation of the coma caused by the diopter adjustment in the first lens group to be suppressed within a minimum allowable range. Above an upper limit of the condition (3), a great fluctuation of the coma due to the diopter adjustment is not preferable.

Figure 5:
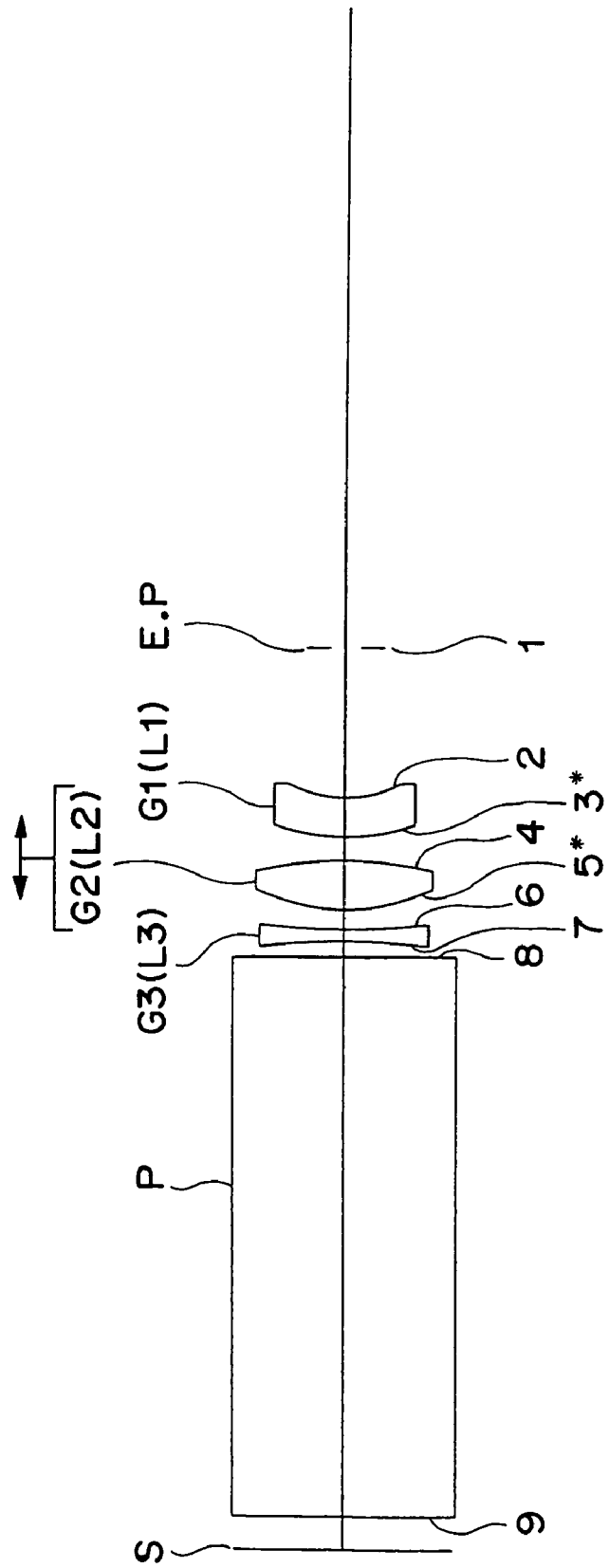
FIG. 5 is a configuration view for showing an eyepiece lens system (−1.00 dpt [m$^{-1}$]) according to the second embodiment of this invention.
Figure 9:
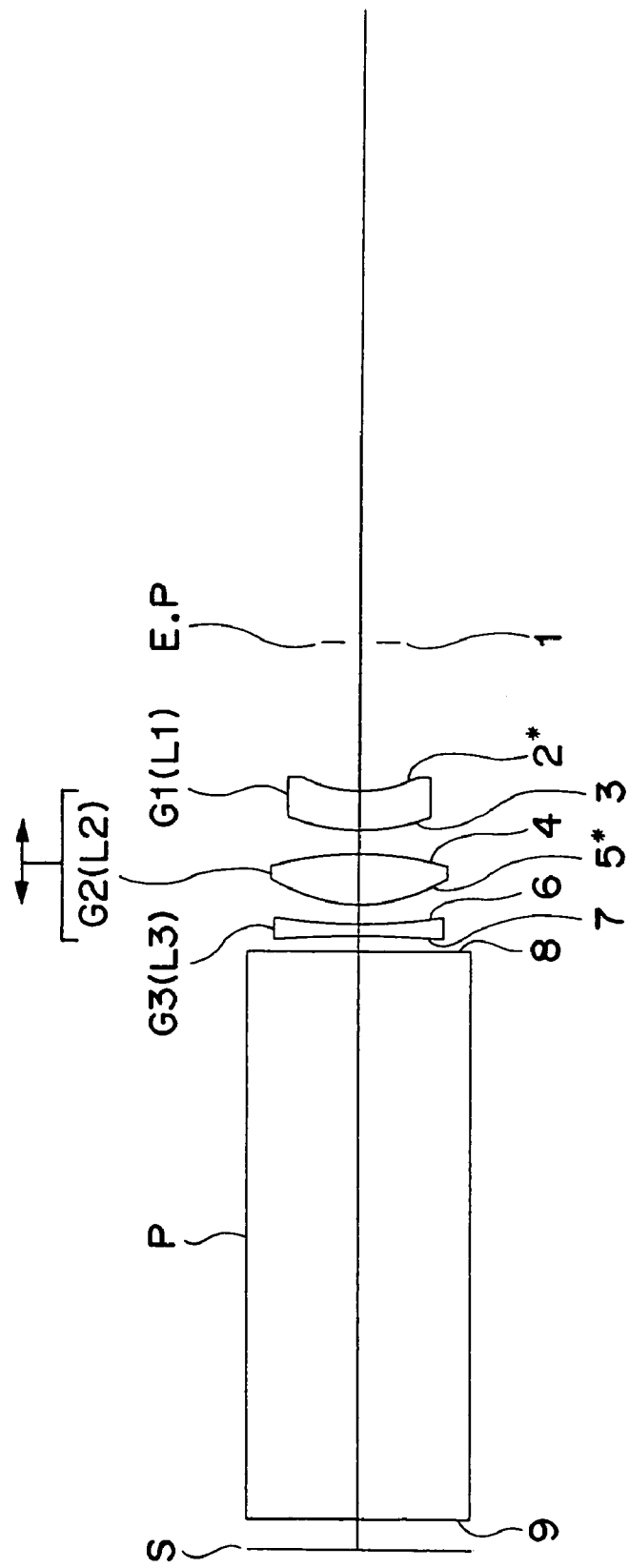
FIG. 9 is a configuration view for showing an eyepiece lens system (−1.00 dpt [m$^{-1}$]) according to the third embodiment of this invention.

Each embodiment of this invention will be described below with reference to the attached drawings. FIGS. 1, 5 and 9 are views for showing lens configurations of a first embodiment of the eyepiece lens of this invention, a second embodiment thereof and a third embodiment thereof. As shown in these views, all these are eyepiece lenses that include first lens group G1 having a negative refracting power including negative meniscus lens L1 with a concave surface facing eyepoint E.P side, second lens group G2 having a positive refracting power with both convex surfaces on both ends of lens L2, and third lens group G3 having a negative refracting power including negative lens L3 in the order from the eyepoint E.P side and adjust the diopter by moving second lens group G2 (lens L2 with both convex surfaces) along the optical axis, and consist of aspherical surfaces so as to make the positive refracting power thereof weak as at least one surface of both convex surfaces of lens L2 deviates from the optical axis. Furthermore, erect system P is arranged between focal surface S and a surface of the third lens group G3 (negative lens L3) on the object side.

Each of the lens configuration views shown in FIGS. 1, 5 and 9 show a state in which erect system 9 is developed, but practically, an erect system like a penta prism and the like is expected.

In each embodiment of this invention having such the lens configuration, in the order from the left side in each lens configuration view, all of images on focal surface S is inverted into erect images through erect system P and then the eyepiece lens of this invention configured by three groups G1 to G3 enlarges the erect image, and thereby the image is observed at eyepoint E.P.

As below, tables 1, 2 and 3 are tables for showing the specifications in each lens element of the first, second and third embodiments of the eyepiece lens of this invention. In all of the tables, "m" in the first column indicates numbers of each optical surface when eyepoint E.P is 1 (hereinafter referred to as a surface number. The mark * on the left shoulder of the number indicates a lens surface formed in an aspherical shape.), "r" in the second column indicates a radius of curvature of each optical surface (or a radius of curvature of a base spherical surface when the surface is an aspherical surface), "d" in the third column indicates a distance from each optical surface to a next optical surface (hereinafter referred to as a surface distance), "nd" in the fourth column indicates an index of refraction for the line d ($\lambda$=587.6 nm), and $\nu$d indicates an Abbe number, respectively. Also, "fe" indicates a focal length of an eyepiece optical system, "d1" indicates the surface distance shown in surface number 1 (the surface distance from the surface number 1 or eyepoint E.P to surface number 2), "d3" indicates the surface distance shown in surface number 3 (i.e., the surface distance from the surface number 3 to surface number 4), and "d5" indicates the surface number 5 shown in surface number 5 (i.e., the surface distance from the surface number 5 to surface number 6).

The unit of the diopter in the specifications is [m$^{-1}$]. For example, a diopter X dpt [m$^{-1}$] indicates a state of an image viewed through the eyepiece lens being formed at a position of 1/X (m: meter) from the eyepoint on the optical axis. When the image is formed on the observer side from the eyepiece lens, it is termed "positive".

Though focal length fe, radius of curvature r, surface distance d and the other data in the specifications are generally expressed in "mm", the unit of the data is not limited to this since the optical system can provide the same optical performance even if it is proportionally enlarged or reduced.

An aspherical surface with the mark * in the specifications is expressed by the following numerical formula (4):

$$x=(y^2/r)/\{1+(1-(1+\kappa)\cdot y^2/r^2)^{1/2}\}+C_4 y^4+C_6 y^6+C_8 y^8+C_{10}y^{10} \quad (4)$$

where the height of the aspherical surfaces in a direction perpendicular to the optical axis is y, the distance along the optical axis from a tangential surface at the vertex of the aspherical surface to the position on the aspherical surface at height y (sag amount) is x, the paraxial radius of curvature is r, a conic coefficient is $\kappa$ and the aspherical coefficient of the n-th order is $C_n$, respectively.

First Embodiment

A first embodiment of an eyepiece lens according to this invention will be described with reference to attached drawings 1 to 4 and table 1. FIG. 1 is a cross section view for showing a lens which has an eyepiece lens (a diopter is −1.00 dpt [m$^{-1}$]) according to the first embodiment of this invention. Also, table 1 shows specifications of each lens in the first embodiment.

TABLE 1

| m | r | d | nd | $\nu$d | |
|---|---|---|---|---|---|
| 1 | ∞ | d1 | 1.000000 | | E.P |
| 2 | 14.43420 | 5.00000 | 1.491080 | 57.57 | L1 (G1) |
| *3 | −22.42965 | d3 | 1.000000 | | |
| 4 | 35.88808 | 6.50000 | 1.508710 | 56.4 | L2 (G2) |
| *5 | −18.35980 | d5 | 1.000000 | | |
| 6 | −58.42210 | 1.50000 | 1.846660 | 23.8 | L3 (G3) |
| 7 | 174.05687 | 2.00000 | 1.000000 | | |
| 8 | ∞ | 71.11400 | 1.516800 | 64.1 | P |
| 9 | ∞ | 4.40000 | 1.000000 | | S |

(Aspherical surface data)

| m | $\kappa$ | $C_4$ | $C_6$ | $C_8$ |
|---|---|---|---|---|
| 3 | −0.01660 | 0.50195 × 10$^{-6}$ | −0.10420 × 10$^{-6}$ | 0.19322 × 10$^{-9}$ |
| 5 | −0.18910 | 0.39791 × 10$^{-5}$ | 0.68480 × 10$^{-7}$ | −0.18551 × 10$^{-9}$ |

(Variable distance)

| fe | 57.53 | 56.23 | 53.89 |
|---|---|---|---|
| diopter | −2.07 | −1.00 | 1.05 |
| d1 | 18.50 | 19.50 | 21.50 |
| d3 | 3.80 | 3.00 | 1.40 |
| d5 | 1.70 | 2.50 | 4.10 |

(Conditional formula)

| (1) | 1.6 < f1/f3 = 2.02 < 2.5 |
|---|---|
| (2) | −0.55 < S3 = −0.50 ≦ 0 |
| (3) | S1 = −4.61 < −3.0 |

With this, it can be seen that the above conditional formulas (1) through (3) are all satisfied in the first embodiment.

Figure 3:
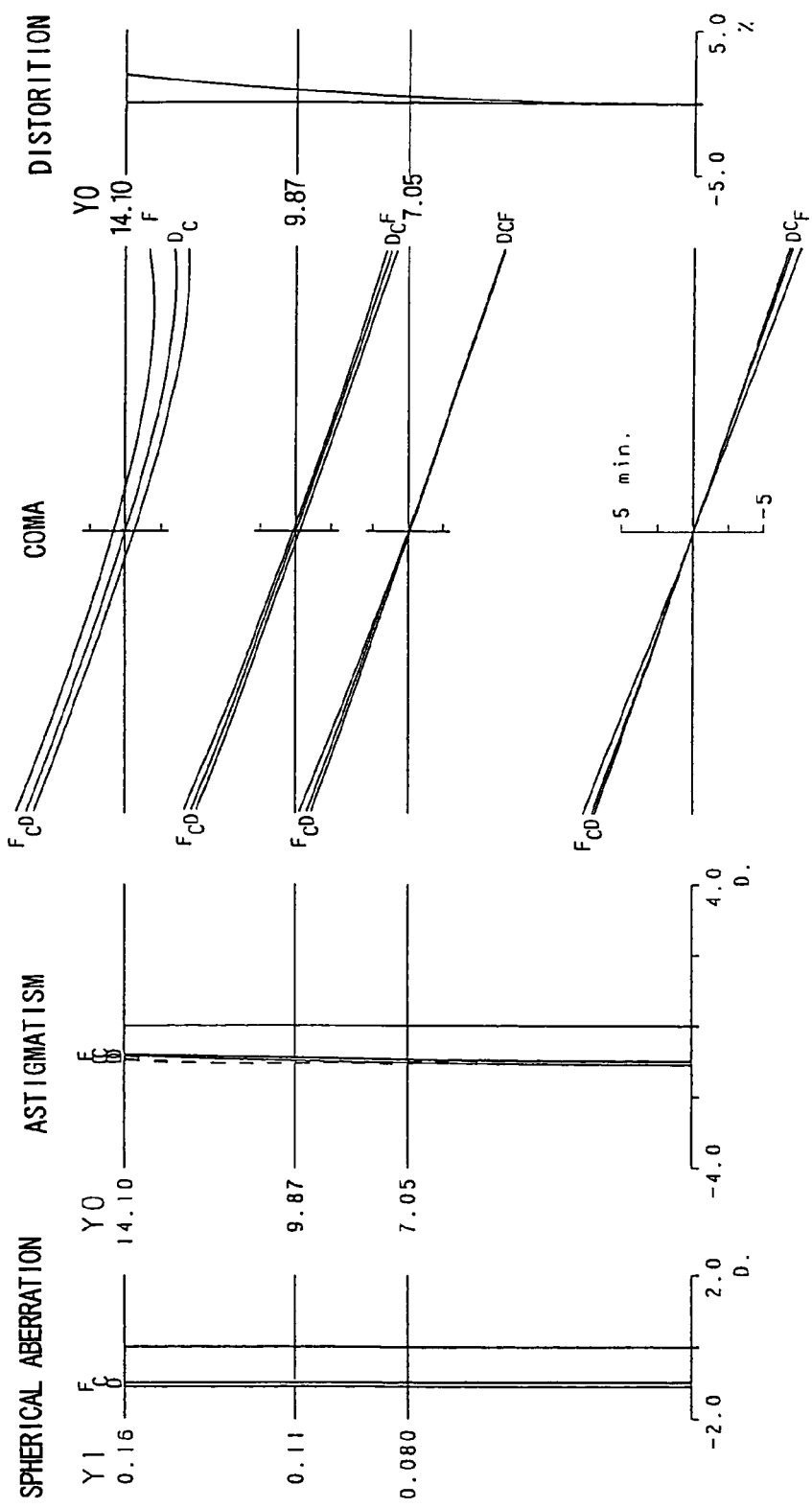
FIG. 3 is an aberration view when the diopter is −1.00 dpt [m$^{-1}$] in the first embodiment of this invention.
Figure 4:
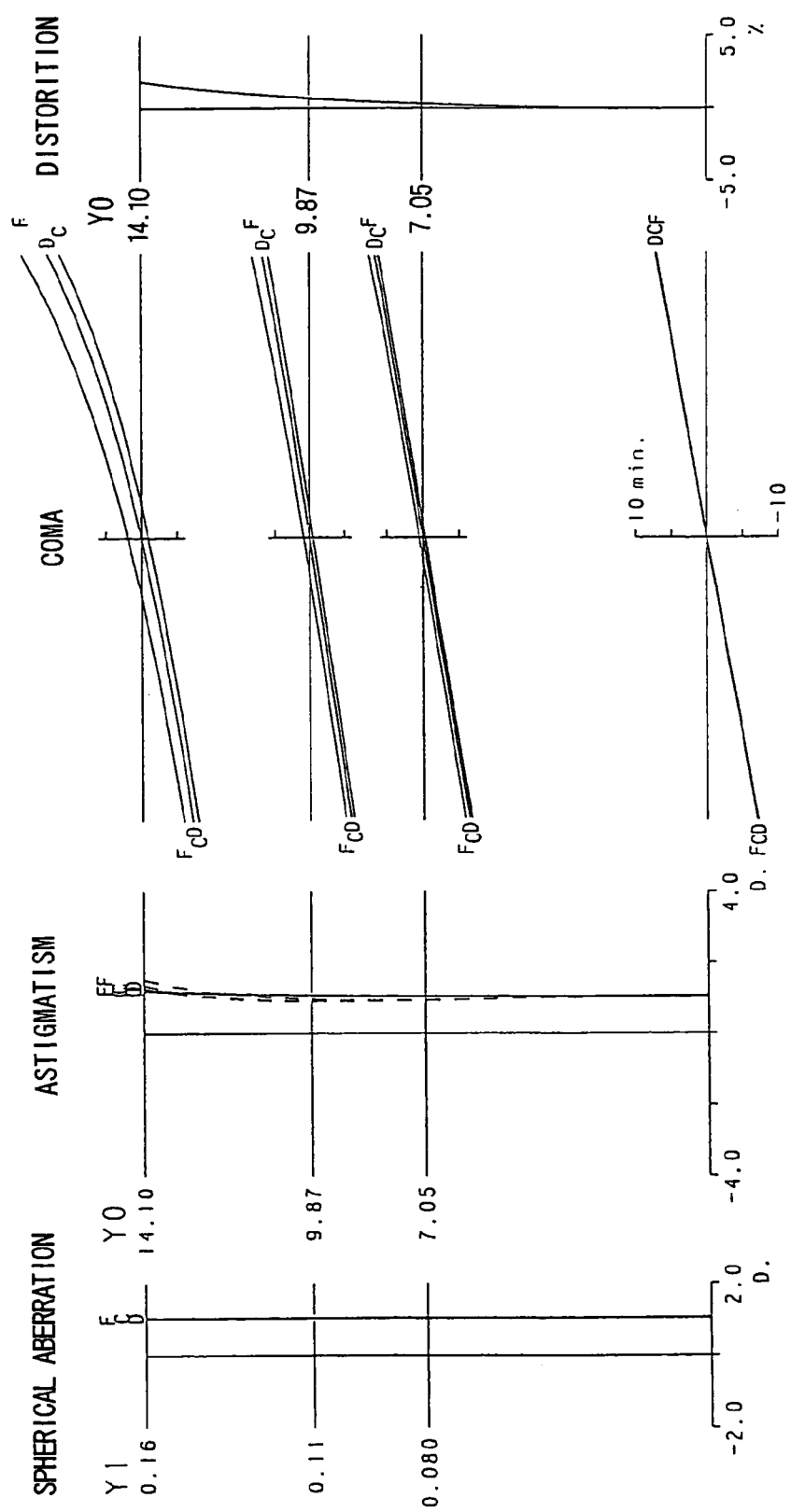
FIG. 4 is an aberration view when the diopter is −1.05 dpt [m$^{-1}$] in the first embodiment of this invention.

FIGS. 3, 4 and 5 are views showing aberrations, respectively, when the diopter is −2.07 dpt [m$^{-1}$], when the dipoter is −1.00 dpt [m$^{-1}$] and when the diopter is 1.05 dpt [m$^{-1}$]. Each aberration view indicates spherical aberration, astigmatism, coma and distortion in the order from the left. In these views of the aberrations, Y1 indicates an incident height of a light beam on erect system P, and Y0 the height of the object on focal surface S, respectively. A solid line and a broken line in the astigmatism indicates a sagittal image surface and a meridional image surface, respectively. "min" for the coma indicates a minute of the angular unit. The unit along the horizontal axis for the spherical aberration and the astigmatism is expressed in [m$^{-1}$], respectively and indicated by D in the views. Further, C, F and D in the views indicate aberration curves on the line C (656.28 nm), the line F (486.13 nm) and the line D (587.56 nm), respectively. The above-mentioned descriptions of the aberration view in the present embodiment are the same as those in the other embodiments.

As clearly seen from each aberration view, the aberrations are excellently corrected, and the first embodiment shows that an excellent optical performance is ensured within a range of the diopter adjustment.

Second Embodiment

A second embodiment of an eyepiece lens according to this invention will be described below with reference to attached drawings 5 to 8 and table 2. FIG. 5 is a cross section view for showing a lens which has an eyepiece lens (the diopter is −1.00 dpt [m$^{-1}$]) according to the second embodiment of this invention. Also, Table 2 shows specifications of each lens in the second embodiment.

TABLE 2

| m | r | d | nd | νd | |
|---|---|---|---|---|---|
| 1 | ∞ | d1 | 1.000000 | | E.P |
| 2 | −15.25078 | 5.00000 | 1.491080 | 57.57 | L1 (G1) |
| *3 | −26.73317 | d3 | 1.000000 | | |
| 4 | 47.40778 | 6.30000 | 1.673960 | 55.3 | L2 (G2) |
| *5 | −22.68702 | d5 | 1.000000 | | |
| 6 | −86.74734 | 1.50000 | 1.846660 | 23.8 | L3 (G3) |
| 7 | 86.74734 | 2.00000 | 1.000000 | | |
| 8 | ∞ | 71.11400 | 1.516800 | 64.1 | P |
| 9 | ∞ | 4.30000 | 1.000000 | | S |

(Aspherical surface data)

| m | κ | $C_4$ | $C_6$ | $C_8$ |
|---|---|---|---|---|
| 3 | 0.19190 | −0.12434 × 10$^{-5}$ | −0.25478 × 10$^{-7}$ | −0.96492 × 10$^{-10}$ |
| 5 | −0.45240 | 0.40170 × 10$^{-5}$ | 0.17457 × 10$^{-7}$ | −0.28072 × 10$^{-10}$ |

(Variable distance)

| fe | 56.79 | 55.68 | 53.63 |
|---|---|---|---|
| diopter | −2.06 | −1.00 | 1.08 |
| d1 | 18.50 | 19.10 | 21.50 |
| d3 | 3.80 | 3.00 | 1.35 |
| d5 | 1.70 | 2.50 | 4.15 |

(Conditional formula)

| (1) | 1.6 < f1/f3 = 1.65 < 2.5 |
|---|---|
| (2) | −0.55 < S3 = 0.00 ≦ 0 |
| (3) | S1 = −3.66 < −3.0 |

With this, it can be seen that the above conditional formulas (1) through (3) are all satisfied in the second embodiment.

Figure 6:
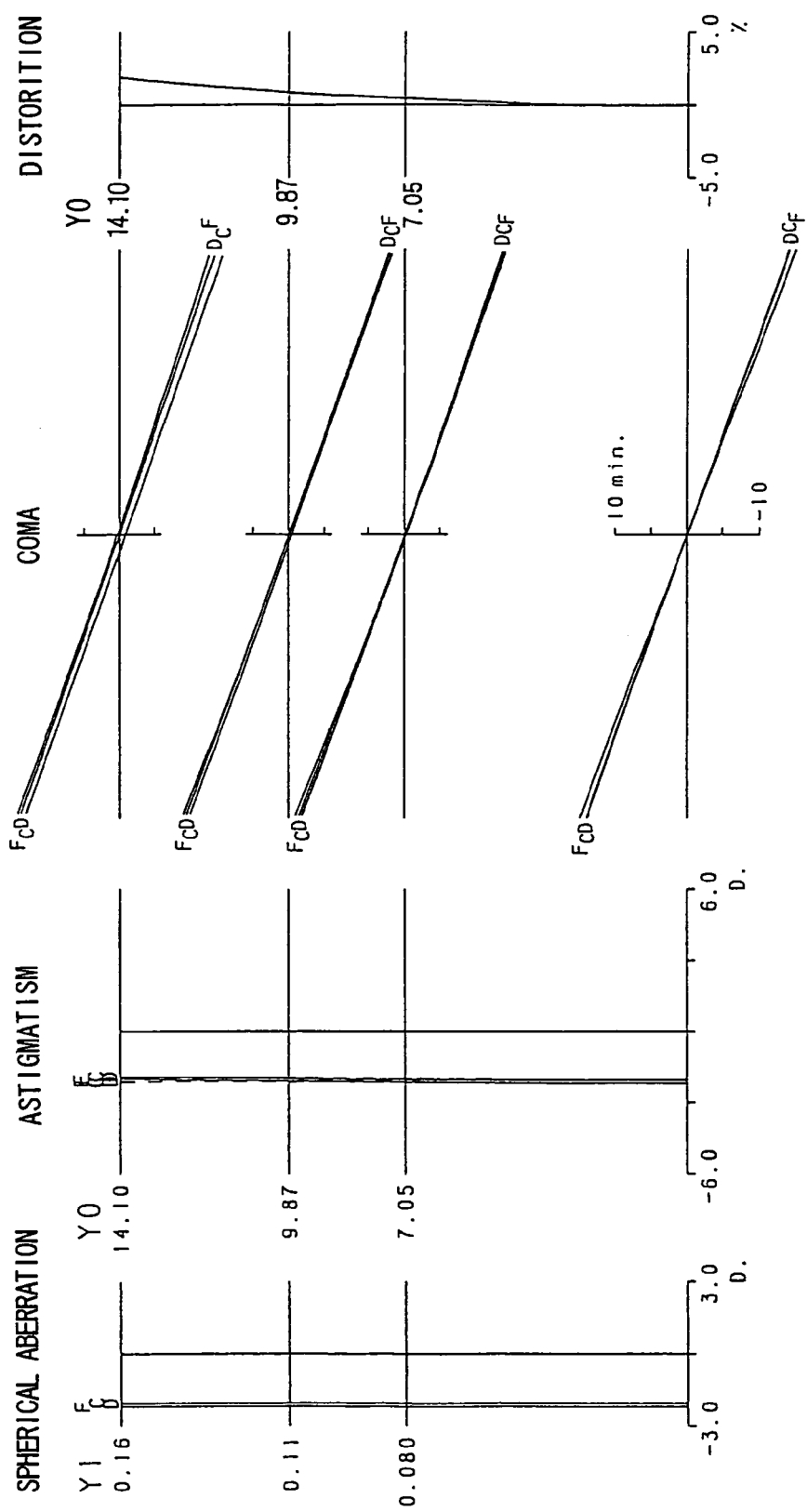
FIG. 6 is an aberration view when the diopter is −2.06 dpt [m$^{-1}$] in the second embodiment of this invention.
Figure 7:
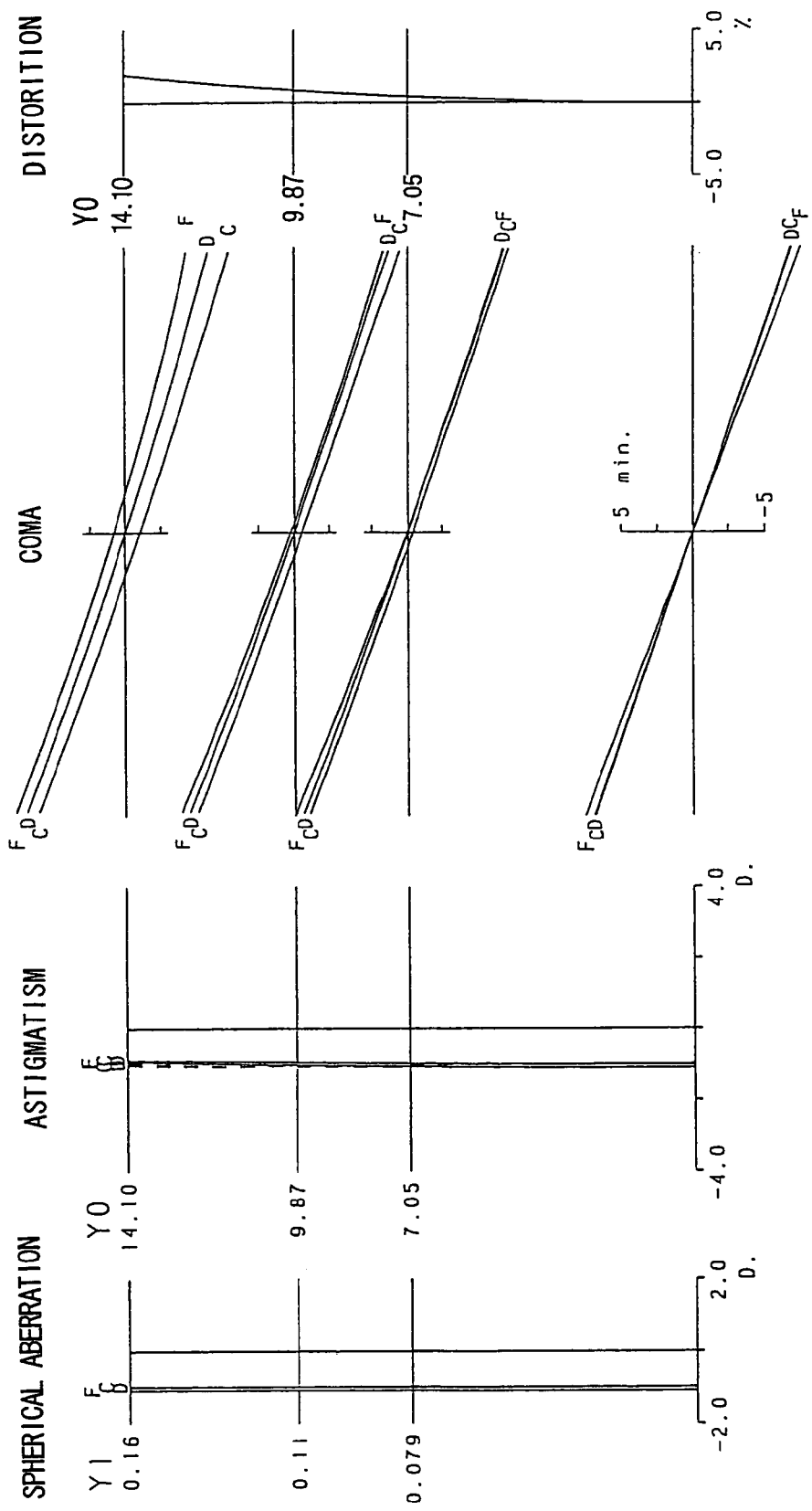
FIG. 7 is an aberration view when the diopter is −1.00 dpt [m$^{-1}$] in the second embodiment of this invention.
Figure 8:
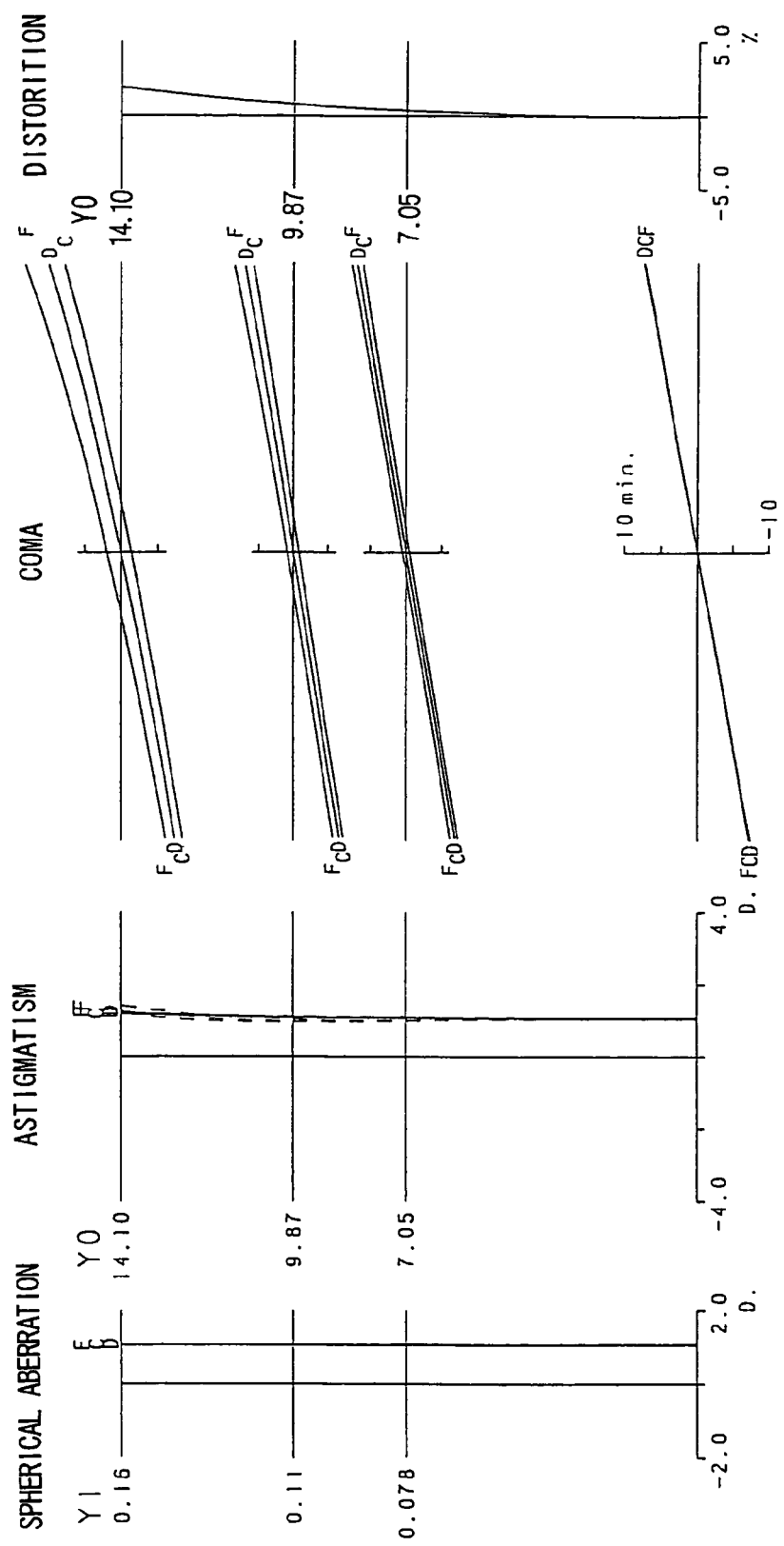
FIG. 8 is an aberration view when the diopter is −1.08 dpt [m$^{-1}$] in the second embodiment of this invention.

FIGS. 6, 7 and 8 are views showing aberrations, respectively, when the diopter is −2.06 dpt [m$^{-1}$], when the dipoter is −1.00 dpt [m$^{-1}$] and when the diopter is 1.08 dpt [m$^{-1}$]. As clearly seen from each aberration view, the aberrations are excellently corrected, and the second embodiment shows that an excellent optical performance is ensured within a range of the diopter adjustment.

A third embodiment of an eyepiece lens according to this invention will be described below with reference to attached drawings 9 to 12 and table 3. FIG. 9 is a cross section view for showing a lens which has an eyepiece lens (the diopter is −1.00 dpt [m$^{-1}$]) according to the third embodiment of this invention. Also, Table 3 shows specifications of each lens in the third embodiment.

TABLE 3

| m | r | d | nd | νd | |
|---|---|---|---|---|---|
| 1 | ∞ | d1 | 1.000000 | | E.P |
| *2 | −16.61312 | 5.00000 | 1.491080 | 57.57 | L1 (G1) |
| 3 | −25.00000 | d3 | 1.000000 | | |
| 4 | 40.12000 | 6.50000 | 1.508710 | 56.4 | L2 (G2) |
| *5 | −18.35980 | d5 | 1.000000 | | |
| 6 | −65.00000 | 1.50000 | 1.846660 | 23.8 | L3 (G3) |
| 7 | 133.93908 | 2.00000 | 1.000000 | | |
| 8 | ∞ | 72.22700 | 1.516800 | 64.1 | P |
| 9 | ∞ | 4.00000 | 1.000000 | | S |

(Aspherical surface data)

| m | κ | $C_6$ | $C_8$ |
|---|---|---|---|
| 2 | 1.90680 | 0.0 | 0.0 |
| 5 | −0.37240 | −0.89327 × 10$^{-8}$ | 0.949216 × 10$^{-10}$ |

(Variable distance)

| fe | 59.17 | 57.71 | 55.06 |
|---|---|---|---|
| diopter | −2.06 | −1.00 | 1.08 |
| d1 | 18.00 | 19.00 | 21.00 |
| d3 | 3.80 | 3.00 | 1.40 |
| d5 | 1.70 | 2.50 | 4.10 |

(Conditional formula)

| (1) | 1.6 < f1/f3 = 2.44 < 2.5 |
|---|---|
| (2) | −0.55 < S3 = −1.35 ≦ 0 |
| (3) | S1 = −4.96 < 3.0 |

With this, it can be seen that the above conditional formulas (1) through (3) are all satisfied in the third embodiment.

Figure 10:
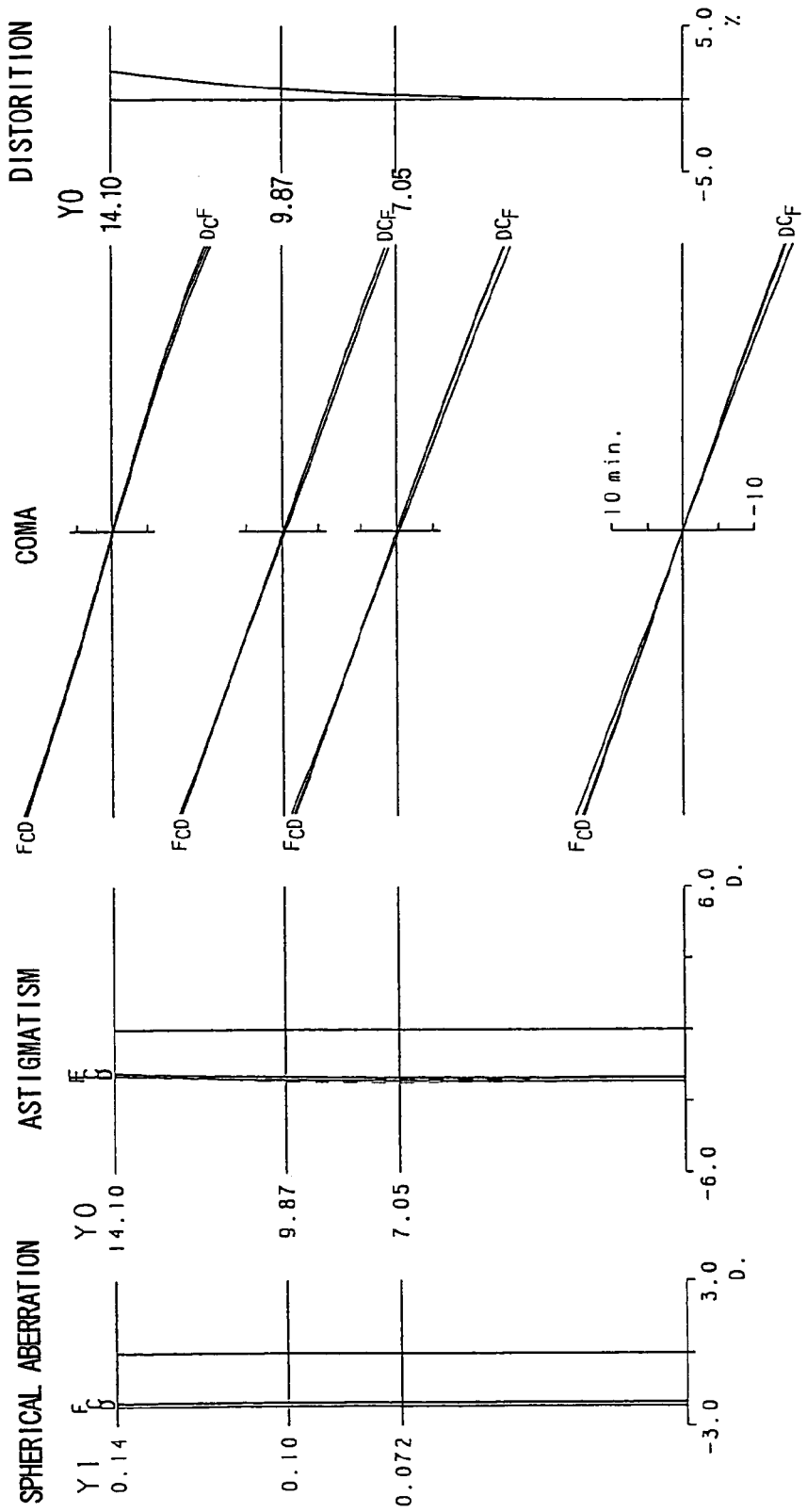
FIG. 10 is an aberration view when the diopter is −2.06 dpt [m$^{-1}$] in the third embodiment of this invention.
Figure 11:
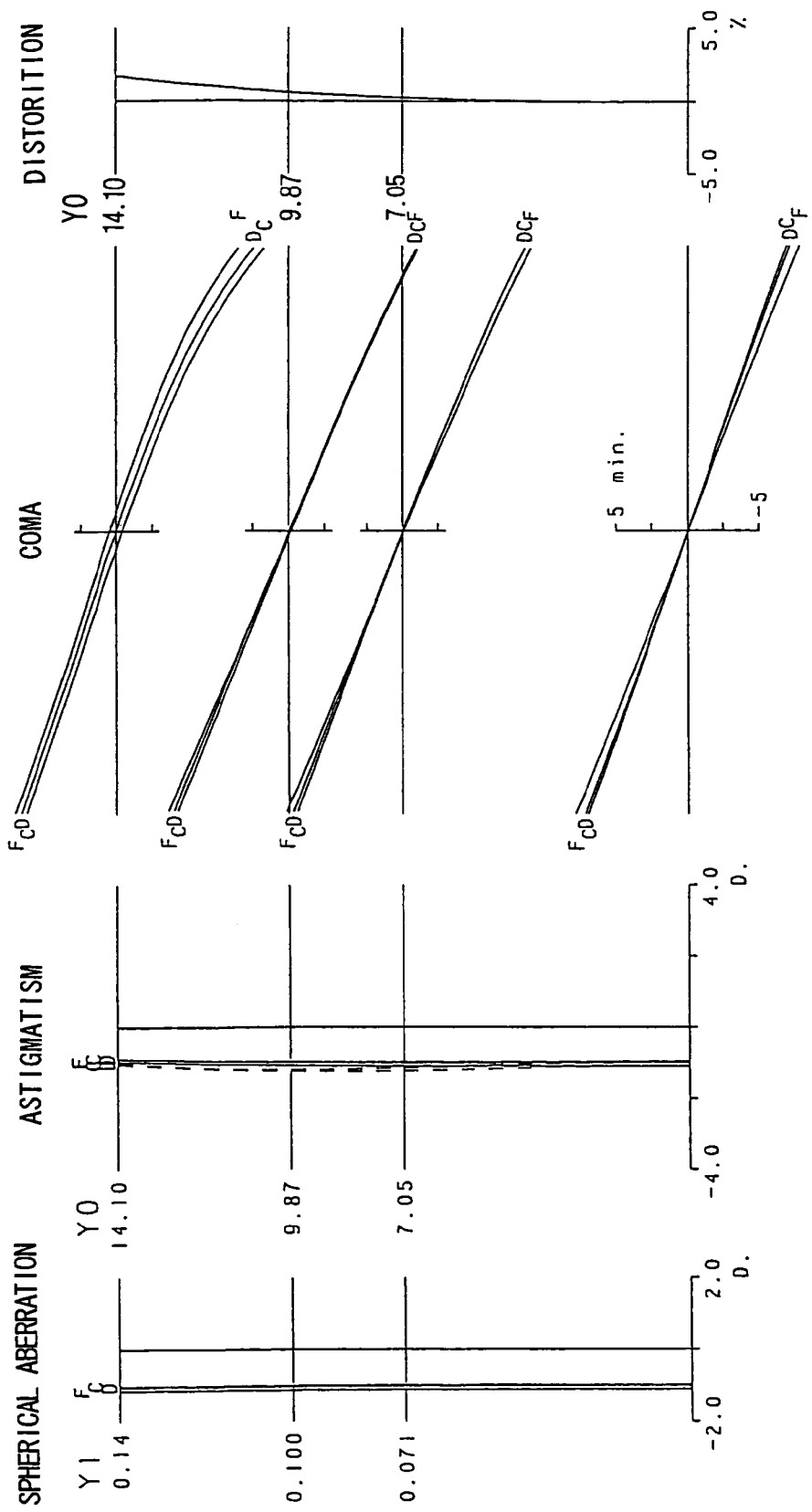
FIG. 11 is an aberration view when the diopter is −1.00 dpt [m$^{-1}$] in the third embodiment of this invention.
Figure 12:
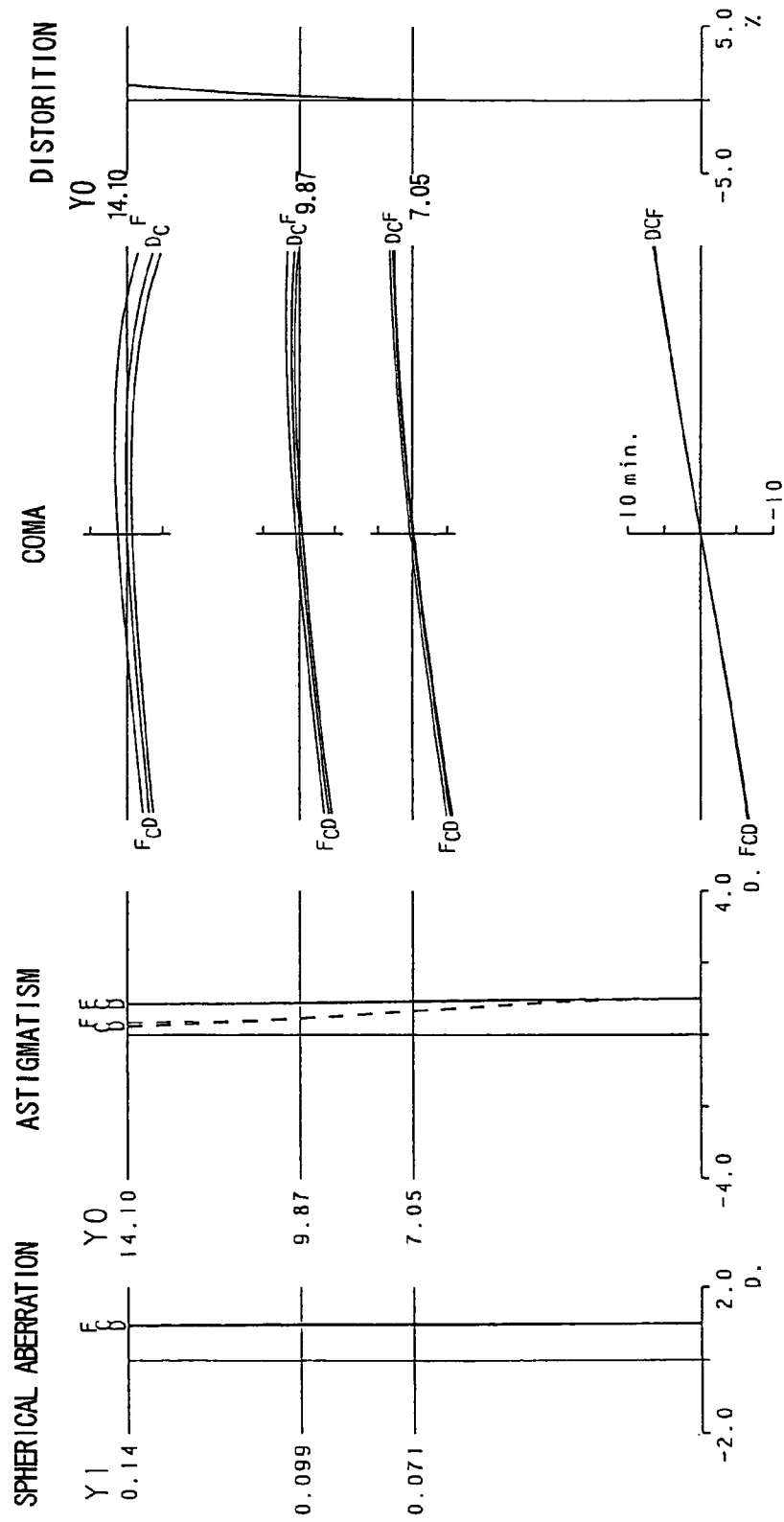
FIG. 12 is an aberration view when the diopter is −1.08 dpt [m$^{-1}$] in the third embodiment of this invention.

FIGS. 10, 11 and 12 are views showing aberrations, respectively, when the diopter is −2.06 dpt [m$^{-1}$], when the dipoter is −1.00 dpt [m$^{-1}$] and when the diopter is 1.08 dpt [m$^{-1}$] in the third embodiment of this invention. As clearly seen from each aberration view, the aberrations are excellently corrected, and the third embodiment shows that an excellent optical performance is ensured within a range of the diopter adjustment.

Like the above, the lens system configured by the three groups has been described as the embodiments of this invention and needless to say, a lens system including four groups or more inclusive of the three groups is the lens system having the inherent effect of this invention. Also, needless to say, even in a configuration of each lens group, a lens group adding only an additional lens element to the configurations of the embodiments is the same lens group having the inherent effect of the invention, too.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An eyepiece lens comprising:
   a first lens group having a negative refracting power including a negative meniscus lens with a concave surface facing an eyepoint side;
   a second lens group having a positive refracting power including a lens with convex surfaces on both ends; and
   a third lens group having a negative refracting power including a negative lens;

said first - third lens groups being arranged in an order from the eyepoint side, said eyepiece lens being capable of varying a diopter by moving the second lens group along an optical axis, wherein the eyepiece lens is configured by aspherical surfaces to make the positive refracting power weak while at least one surface of the convex surfaces of the lens deviates from the optical axis, and in such a manner that conditions of a following formula are satisfied:

$$1.6 < f1/f3 < 2.5$$

$$-0.55 < S3 \leq 0$$

where f1 indicates a focal length of the first lens group, f3 indicates a focal length of the third lens group, and S3 indicates a shape factor of the third lens group, and further wherein said shape factor S3 is defined by a conditional formula $$S3 = (re_3 + rs_3)/(re_3 - rs_3)$$

where $re_3$ indicates a radius of curvature of the third lens group on the eyepoint side and $rs_3$ indicates a radius of curvature thereof on the object side when the lens surfaces are spherical, while $re_3$ indicates a paraxial radius of curvature of the third lens group on the eyepoint side and $rs_3$ indicates a paraxial radius of curvature thereof on the object side when the lens surfaces are aspherical.

2. The eyepiece lens according to claim 1, wherein a following formula $$S1 < -3.0$$

is satisfied, and where S1 indicates a shape factor of the first lens group and further wherein said shape factor S1 is defined by a conditional formula $$S1 = (re_1 + rs_1)/(re_1 - rs_1)$$

where $re_1$ indicates a radius of curvature of the first lens group on the eyepoint side and $rs_1$ indicates a radius of curvature thereof on the object side when the lens surfaces are spherical, while $re_1$ indicates a paraxial radius of curvature of the first lens group on the eyepoint side and $rs_1$ indicates a paraxial radius of curvature thereof on the object side when the lens surfaces are aspherical.

3. A method of magnifying an image of an object for observing the image, comprising the steps of:

providing an eyepiece lens that includes, in an order from the eyepoint side, a first lens group having a negative refracting power including a negative meniscus lens with a concave surface facing an eyepoint side, a second lens group having a positive retracting power including a lens with convex surfaces on both ends, and a third lens group having a negative refracting power including a negative lens; and moving the second lens group along an optical axis of the eyepiece lens to adjust diopter of the eyepiece lens, wherein the eyepiece lens is configured by aspherical surfaces to make the positive refracting power weak while at least one surface of the convex surfaces of the lens deviates from the optical axis, in such a manner that conditions of a following formula are satisfied:

$$1.6 < f1/f3 < 2.5$$

$$-0.55 < S3 \leq 0$$

where f1 indicates a focal length of the first lens group, f3 indicates a focal length of the third lens group, and S3 indicates a shape factor of the third lens group, and further wherein said shape factor S3 is defined by a conditional formula $$S3 = (re_3 + rs_3)/(re_3 - rs_3)$$

where $re_3$ indicates a radius of curvature of the third lens group on the eyepoint side and $rs_3$ indicates a radius of curvature thereof on the object side when the lens surfaces are spherical, while $re_3$ indicates a paraxial radius of curvature of the third lens group on the eyepoint side and $rs_3$ indicates a paraxial radius of curvature thereof on the object side when the lens surfaces are aspherical.

4. The method of magnifying an image of an object for observing the image, according to claim 3, wherein a following formula $$S1 < -3.0$$

is satisfied, and where S1 indicates a shape factor of the first lens group, and further wherein said shape factor S1 is defined by a conditional formula $$S1 = (re_1 + rs_1)/(re_1 - rs_1)$$

where $re_1$ indicates a radius of curvature of the first lens group on the eyepoint side and $rs_1$ indicates a radius of curvature thereof on the object side when the lens surfaces are spherical, while $re_1$ indicates a paraxial radius of curvature of the first lens group on the eyepoint side and $rs_1$ indicates a paraxial radius of curvature thereof on the object side when the lens surfaces are aspherical.

* * * * *